(12) United States Patent
Mühlemann (10) Patent No.: US 11,001,433 B2
(45) Date of Patent: May 11, 2021

(54) CAPSULE SYSTEM

(71) Applicant: Mühlemann IP GmbH, Stein am Rhein (CH)

(72) Inventor: Rolf Mühlemann, Schlattingen (CH)

(73) Assignee: Mühlemann IP GmbH, Stein am Rhein (CH)

( * ) Notice: Subject to any disclaimer, the term of this patent is extended or adjusted under 35 U.S.C. 154(b) by 255 days.

(21) Appl. No.: 16/087,173

(22) PCT Filed: Mar. 21, 2017

(86) PCT No.: PCT/EP2017/056662
§ 371 (c)(1),
(2) Date: Sep. 21, 2018

(87) PCT Pub. No.: WO2017/162649
PCT Pub. Date: Sep. 28, 2017

(65) Prior Publication Data
US 2019/0062034 A1 Feb. 28, 2019

(30) Foreign Application Priority Data

Mar. 22, 2016 (EP) .................................. 16161748
Apr. 5, 2016 (EP) .................................. 16163869

(51) Int. Cl.
*B65D 81/32* (2006.01)
*B65D 85/804* (2006.01)
*A47J 31/06* (2006.01)

(52) U.S. Cl.
CPC ..... *B65D 81/3216* (2013.01); *B65D 85/8043* (2013.01); *A47J 31/0668* (2013.01)

(58) Field of Classification Search
CPC .................. B65D 81/3216; B65D 85/8043
See application file for complete search history.

(56) References Cited

U.S. PATENT DOCUMENTS 6,645,537 B2    11/2003    Sweeney et al.
9,227,778 B2 *   1/2016    Aviles ................ B65D 81/3238
(Continued)

FOREIGN PATENT DOCUMENTS

CN     1419513 A    5/2003
CN     103189284 A  7/2013
(Continued)

OTHER PUBLICATIONS

Search Report dated Aug. 23, 2019 for Chinese Application No. 2017800199021.
(Continued)

*Primary Examiner* — Viren A Thakur
*Assistant Examiner* — Chaim A Smith
(74) *Attorney, Agent, or Firm* — Paul D. Bianco; Gary S. Winer; Fleit Intellectual Property Law (57) ABSTRACT

A capsule system for expanding the range of application of extraction capsules. The capsule system includes a holding capsule, in which the extraction capsule is held. An annular trough remains between the jacket wall of the extraction capsule and the jacket wall of the holding capsule. The capsule system makes it possible to guide a good in the annular trough with a mixing medium around the extraction capsule and through through-flow openings, while an extraction medium is guided through the extraction capsule. Both media are mixed in a mixing chamber and exit through an outlet opening.

11 Claims, 6 Drawing Sheets

(56) References Cited

U.S. PATENT DOCUMENTS

2013/0216663 A1  8/2013  Dogan et al.
2014/0161940 A1  6/2014  Aviles et al.

FOREIGN PATENT DOCUMENTS

CN        204169657 U    2/2015
WO       2014/057094 A1  4/2014
WO       2015/124526 A1  8/2015
WO       2016/005155 A1  1/2016

OTHER PUBLICATIONS

Office Action dated Aug. 23, 2019 for Chinese Application No. 2017800199021.
English language comments on Office Action dated Aug. 23, 2019 for Chinese Application No. 2017800199021.
International Search Report dated Apr. 27, 2017 for PCT/EP2017/056662, filed Mar. 21, 2017.
Written Opinion for PCT/EP2017/056662, filed Mar. 21, 2017.
International Preliminary Report on Patentability dated Sep. 25, 2018 with Written Opinion for PCT/EP2017/056662, filed Mar. 21, 2017.

\* cited by examiner

CAPSULE SYSTEM

FIELD OF THE INVENTION

The present invention relates to a capsule system with a closed extraction capsule having an injection-side bottom with a molded on opening that expands conically to the extraction side and is closed with a sealing film, with a peripherally outwardly aligned flange.

BACKGROUND OF THE INVENTION

A few years ago, basic protective rights relating to capsules for preparing expresso coffee according to the extraction process expired. An extraordinarily dynamic development has taken place since then. Even though the earliest protective rights also already noted that such capsules are not only suitable for preparing coffee, but rather that other beverages and liquid foods could also be made by means of such capsules, such capsules have to date not established themselves anywhere except in the beverage market, and even here confined essentially to coffee and tea.

One reason for this lies in the fact that, if various portions to be mixed are present in one and the same capsule, a considerable loss in flavor must virtually always be expected. For example, in coffee capsules with freshly ground coffee, practically no milk can be added, not even in the form of powdered milk, without the flavor of the freshly ground coffee losing significant purity. Solutions in which the capsule has several chambers which accommodate different components to be extracted have to date been unable to establish themselves on the market. Only if the capsule contains fully soluble portions can these portions today even be completely extracted from the capsule during preparation. The insoluble portions are held back by the screen plates present on the machine side or capsule side, and would even jam the latter. However, soups that contain only fully soluble portions, such as pure meat or yeast extracts, significantly limit the number of possible variations.

SUMMARY OF THE INVENTION

Consequently, the disclosure relates to a capsule system that makes it possible to use an extraction medium to remove fully soluble portions from the extraction capsule on the one hand, and add soluble or less soluble or insoluble portions from the capsule system to the extraction medium by means of a mixing medium on the other.

Other embodiments and features are also disclosed.

A large number of possible variations is enabled by the solution according to the invention of a capsule system, which always consists of two capsules, specifically a holding capsule on the one hand and an extraction capsule held in the holding capsule on the other. This makes it possible to inject an extraction medium via the extraction capsule on the one hand, and to guide a mixing medium that flows around the extraction capsule through the space between the extraction capsule and holding capsule on the other. Depending on whether these two media are guided through the capsule system simultaneously or sequentially, the two media are mixed together either in a collecting vessel, such as a cup or plate, or already in an area below the extraction capsule in the holding capsule.

If the two fluid media are to be mixed together inside of the capsule system, the space below the extraction capsule acts as a mixing chamber in the holding capsule, and can be provided with corresponding flow baffles that enable a desired mixing of the extraction medium with the mixing medium. For example, it can here be ensured that no undesired insoluble portions get out of the extraction capsule and into the finished end product, while on the other hand partially insoluble or difficultly soluble portions added to the extraction medium by means of the mixing medium can most definitely get into the finished product.

BRIEF DESCRIPTION OF THE DRAWINGS

The drawing presents simplified views of exemplary embodiments of the subject matter of the invention. Shown on.

DETAILED DESCRIPTION OF THE INVENTION

The capsule system according to the invention is marked 1. This capsule system comprises two separately fabricated capsules, specifically an outer capsule referred to as a holding capsule 2 and a smaller capsule lying in the holding capsule 3, which is referred to as an extraction capsule 3. While the term extraction capsule does indicate the possible contents of this capsule 3 on the one hand, the extraction capsule, apart from extractable items like coffee or tea, also has various concentrates, such as fruit juice concentrates, which are available in different viscosity forms, or even yeast, meat or vegetable extracts, which can be contained therein in both liquid and powder form. Therefore, both tea and coffee, which are not present in a soluble form, and thus not derived from freeze-dried concentrates, are not dissolved, but extracted as traditionally the case in a kind of brewing process. In other words, the extraction capsule is completely dissolved and extracted depending on the contents therein, or the insoluble portions are retained in the capsule, either by means of a screen plate or mat inside of the extraction capsule 3 or a screen and perforation plate arranged between the extraction capsule 3 and holding capsule 2. This will be discussed at a later point.

However, the capsule system can be used not just for food purposes, but also in the pharmaceutical area and industrial area, for example for mixing adhesives and primers.

Figure 1:
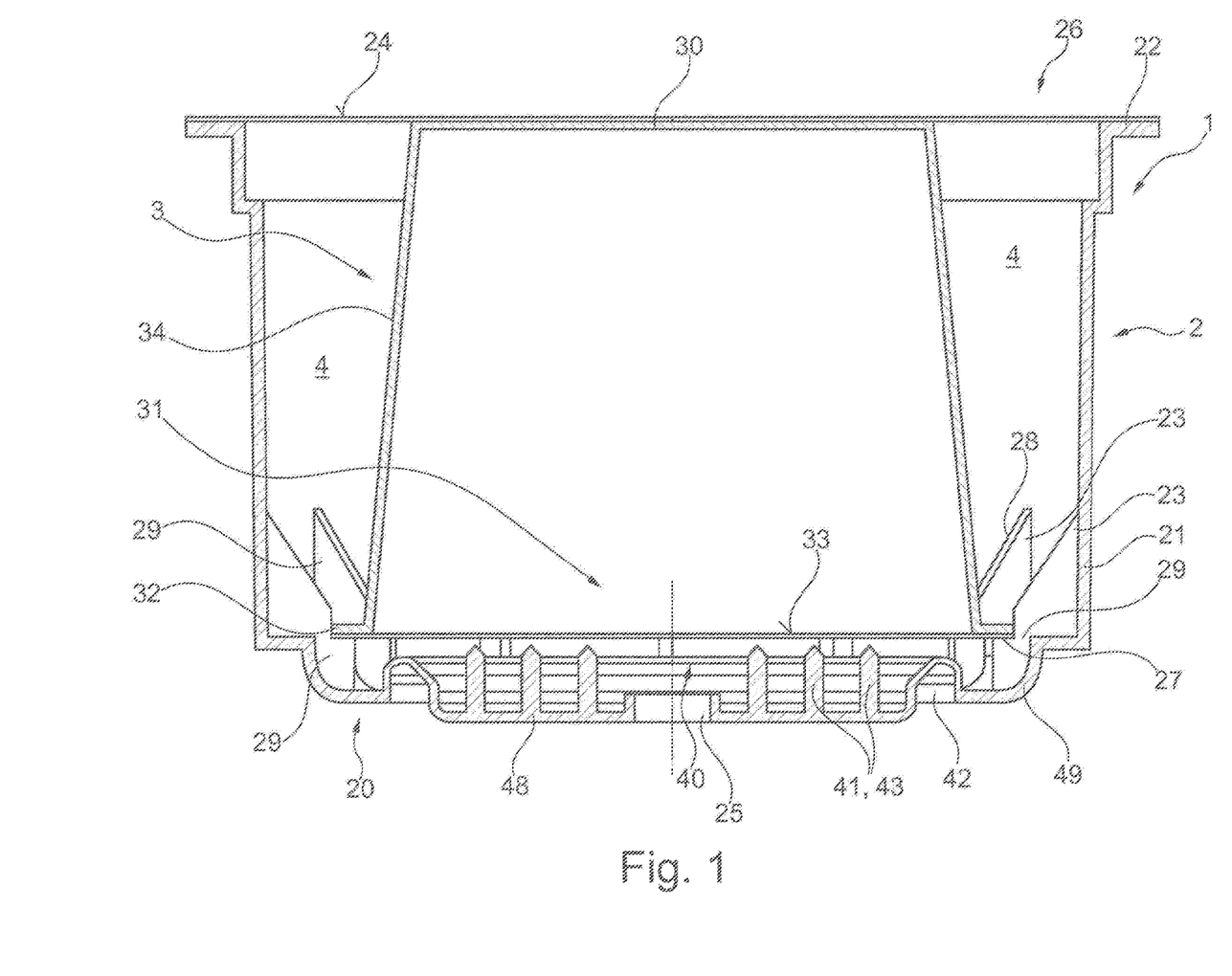
FIG. 1 is a diametric vertical section through a first embodiment of the capsule system according to the invention.

The extraction capsule 3 has an injection-side bottom 30 adjoined by a conical lateral wall 34 that expands toward an extraction-side opening 31. In the area of the extraction-side opening 31, a peripherally outwardly aligned flange 32 is molded onto the conical lateral wall 34. The extraction-side opening 31 is closed by means of a sealing film 33, wherein the sealing film 33 is welded or adhesively bonded onto the flange 32. The sealing film 31 can be a coated or uncoated aluminum film or a one- or multi-layer plastic film, which correspondingly can also contain an aluminum layer or another gas- and/or watertight barrier layer.

This extraction capsule 3 with its extraction-side opening 33 having its sealing film 33 lies below in the outer, larger holding capsule 2.

This holding capsule 2 also has a bottom 20, which is adjoined by a conical lateral wall 21 extending toward another injection-side opening 26. A peripheral, radially outwardly aligned flange 22 is molded onto the lateral wall 21. The holding capsule 2 and extraction capsule 3 are preferably tailored to each other in terms of size in such a way that the injection-side bottom 30 of the extraction capsule 3 lies flush in the same plane spanned by the circumferential flange 22 of the holding capsule 2. In this preferred embodiment, the holding capsule 2 can be welded or adhesively bonded to both the circumferential flange 22 of the holding capsule or welded or adhesively bonded to the injection-side bottom 30 in the same operation. A sealing film 23 is here preferably not welded over the entire surface of the injection-side bottom, but only in its edge area, where at least one peripheral welding bead can be present. Since such welds are preferably made by means of high-frequency welding, several concentric, thin welding ribs can be present instead of a peripheral welding bead, thereby reducing the welding time and diminishing the influence of a food or other content of the capsule system.

The extraction capsule 3 in the holding capsule 2 does not lie directly on its extraction-side bottom, with radially running support means 23 instead being arranged in the holding capsule. On this support means 23, the extraction capsule with its outwardly aligned flange 32 rests on this support means 23.

The support means 23 can have different configurations. For example, the support means can also be a circumferential console into which passages are molded at regular intervals. However, this is a relatively complicated solution in terms of plastics technology, since this console must be upwardly aligned during injection, so that the core remains demoldable, after which the console can be folded down. A solution in which the support means 23 is configured as radially running ribs 27 is much simpler, and thus correspondingly also preferred. Each of these radially running ribs 27 has molded into it a respective step 27 that runs about parallel to the flange 22 of the holding capsule. This step 27 is roughly the same width as or narrower than the width of the flange 32 of the extraction capsule 3. The step 27 does not extend up to the conical lateral wall 21 of the holding capsule 2. Therefore, a flow-through opening 29 is left between the flange 32 of the extraction capsule 3 and the lateral wall 21 of the holding capsule 2 between a respective two adjacent ribs 27. The flow-through opening 29 continues below the flange 32 and between the radially running ribs 27, so that a mixing medium injected in the area between the holding capsule 2 and extraction capsule 3 through the sealing film 24 can flow through this intermediate space via the flow-through openings 29 in the area between the extraction-side bottom 20 of the holding capsule 2 and the sealing film 33 of the extraction capsule 3.

The space between the sealing film 33 of the extraction capsule 3 and the extraction-side bottom 20 of the holding capsule 2 forms a mixing chamber 40. As a consequence, injected liquid that had flowed through the extraction capsule 3 can get into the mixing chamber 40 on the one hand, as can a rinsing medium that was injected through the sealing film 24 into an annular trough 4 between the holding capsule 2 and extraction capsule 3. This annular trough 4 can then store other foods, medication or technical products of a soluble, partially soluble and partially insoluble nature, which are conveyed through the flow-through openings 29 into the mixing chamber 40 by a mixing medium injected into the annular trough 4 through the sealing film 24. The mixing chamber 40 has a central outlet opening 25.

The extraction-side bottom 20 of the holding capsule 2 can have applied to it a variety of flow baffle plates 41, so as to allow the extraction medium from the extraction capsule 3 to be correspondingly mixed with the mixing medium from the annular trough 4 inside of the mixing chamber 40. This mixing is achieved by the mentioned flow baffle plates 41, which are here recorded purely symbolically, and can simultaneously also be the perforation means 43, as preferably the case in the exemplary embodiments.

Figure 6:
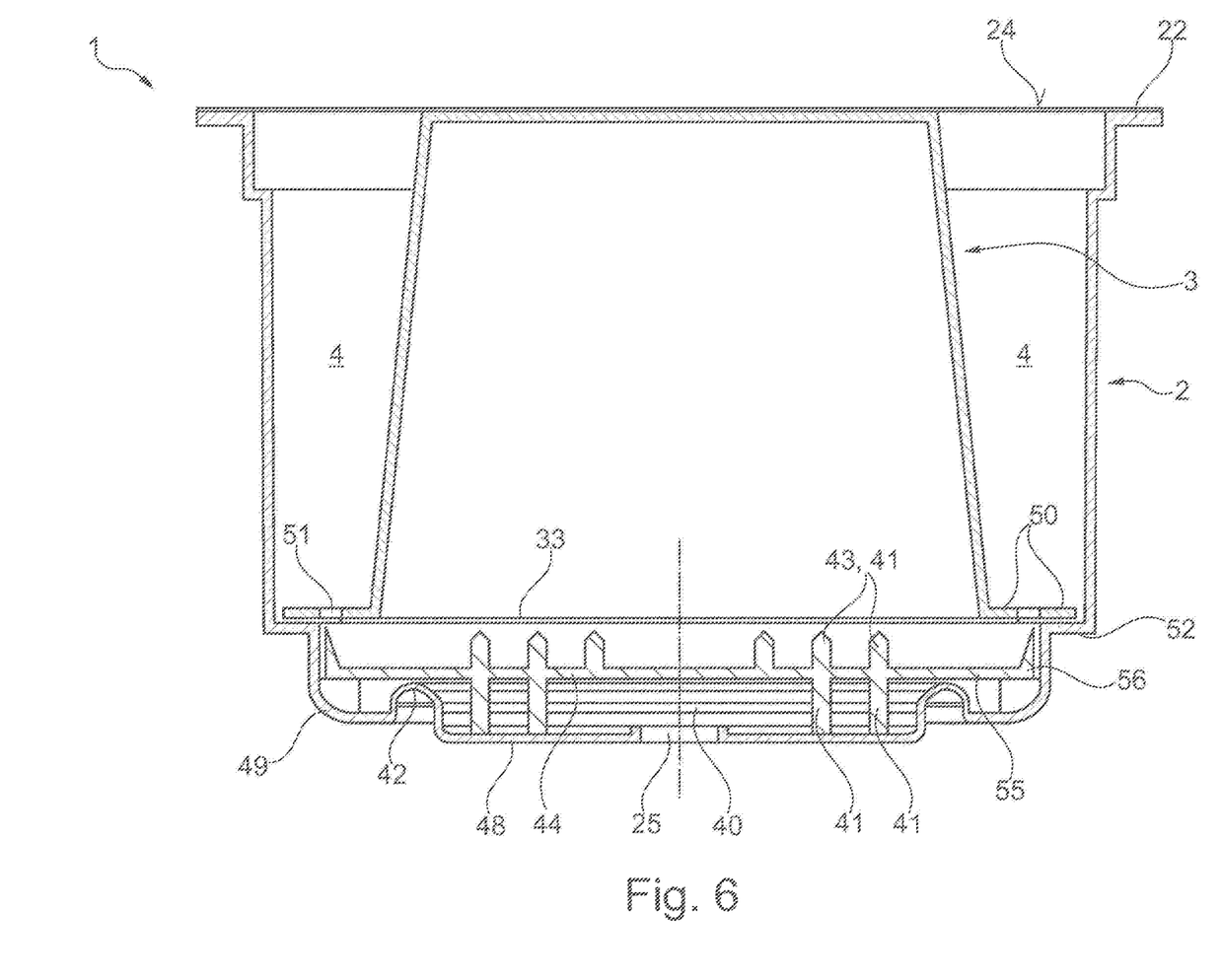

As shown on FIG. 6, a screen and perforation plate 42 can lie on the flow baffle plates 41. However, these flow baffle plates 41 can also be themselves directly configured as a perforation means, which can penetrate through the sealing film 33 of the extraction capsule 3. For this purpose, a large, central, plate-shaped part 48 of the extraction-side bottom 20 is provided with an annular hinge area 42. The annular hinge area 42 is comprised of a thinned wall area in the form of a turned-up portion. The peripheral collar of the hinge area 42 transitions into a stationary edge area 49. The opposing collar of the hinge area 42 is connected with the central bottom plate 48. As a result, the position of the bottom plate can be modified in an axial direction of the holding capsule.

Figure 2:
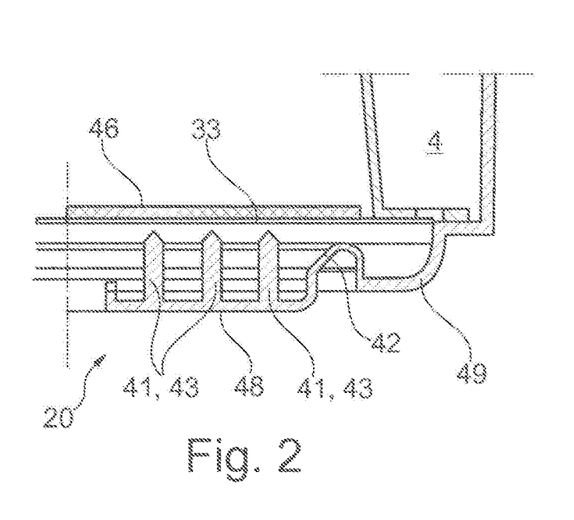
FIG. 2 is a partial section through the extraction-side bottom of the holding capsule in a position before perforating the film of the extraction capsule.
Figure 3:
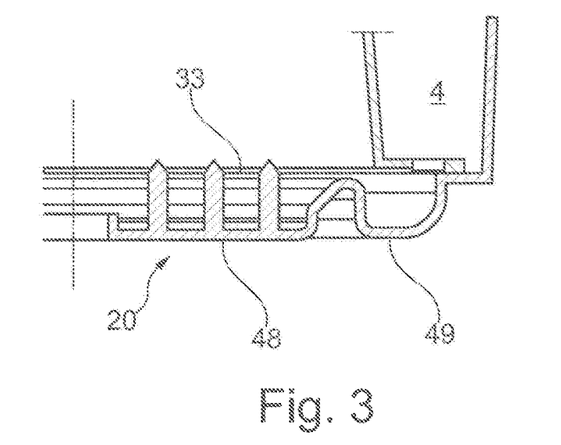
FIG. 3 is the same diametric partial section as on FIG. 2, but in a position in which the film of the extraction capsule has already been perforated.

In the state shown on FIG. 2, the perforation means 43, which can simultaneously be the flow baffle plates 41, do not yet come into contact with the sealing film 33 of the extraction capsule 3. However, since the holding capsule in the present capsule system 1 is somewhat higher than the brewing chamber into which the holding capsule 2 is placed, pressure is exerted on the extraction-side bottom plate 48 while closing the brewing chamber, and the bottom plate 40 is correspondingly pressed upward, getting to the position shown on FIG. 3. The bottom plate here now lies in the same plane as the stationary edge area 49. As already mentioned, a separate screen and perforation plate 44 can be applied on the flow baffle plates 41 or directly on the bottom plate 48. This screen and perforation plate 44 has perforation means 43 and a screen-like perforation or central outlet. The solution presented on FIGS. 2 and 3 shows a variant that does without a screen and perforation plate 44, wherein a screen plate or screen mat can then rest on the sealing film 33 inside of the extraction capsule 3. Of course, such a screen mat or screen plate is only necessary if the contents of the extraction capsule contains solid portions that are to be held back. For example, this holds true if tea or coffee is present in the extraction capsule 3 in an insoluble form. However, if the extraction capsule 3 contains only fully soluble or liquid ingredients, a screen plate or screen mat 46 need not be used. This applies to the variant depicted on FIG. 3.

The annular trough 4 is derived from the shape of the two capsules 2, 3 that form the capsule system 1, specifically the holding capsule 2 and extraction capsule 3. Each separate capsule always has a conical configuration. This is because even in the extreme case where the capsule has a quasi-cylindrical lateral wall, it can in no event be precisely cylindrical, since a tightening angle is always necessary to demold the capsule from an injection mold. Both capsules are always made out of plastic. The extraction capsule lying on the inside can in principle be deep-drawn out of plastic, but given its especially simple configuration, the lateral wall must have a minimum tightening angle for demolding, even in the case of a deep-drawn capsule. In an injection molded capsule, this tightening angle can even measure a bit under one degree, but a corresponding tightening angle always measures several degrees for a deep-drawn capsule. Depending on the selected conicity, the annular trough 4 can have a more or less large volume.

In order to more easily assemble the extraction capsule in the holding capsule, the radial ribs 23 also continue above the step 27. These ribs here run inclined relative to the interior side of the conical lateral wall 21, and form centering ramps 28. When inserting the extraction capsule 3 into the holding capsule 2, the circumferential flange 32 of the extraction capsule 3 is here guided on the step 27 in a centering fashion.

Because the radially running ribs 27 are molded onto not only the conical lateral wall 21, but also in the stationary edge area 49 of the extraction-side bottom of the holding capsule 2, this yields an ideal stiffening of the stationary edge area 49.

The capsule system 1 according to the invention permits a large number of possible uses. In addition to holding foods, various other soluble and insoluble items can be accommodated in the extraction capsule, and in the annular trough 4, which adjoin in a precisely prescribed mixing ratio, and can be mixed with various extraction media and mixing media in the mixing chamber. Different pharmaceutical agents as well as chemical-technical products, for example adhesives or the like, can be combined in this way.

Figure 4:
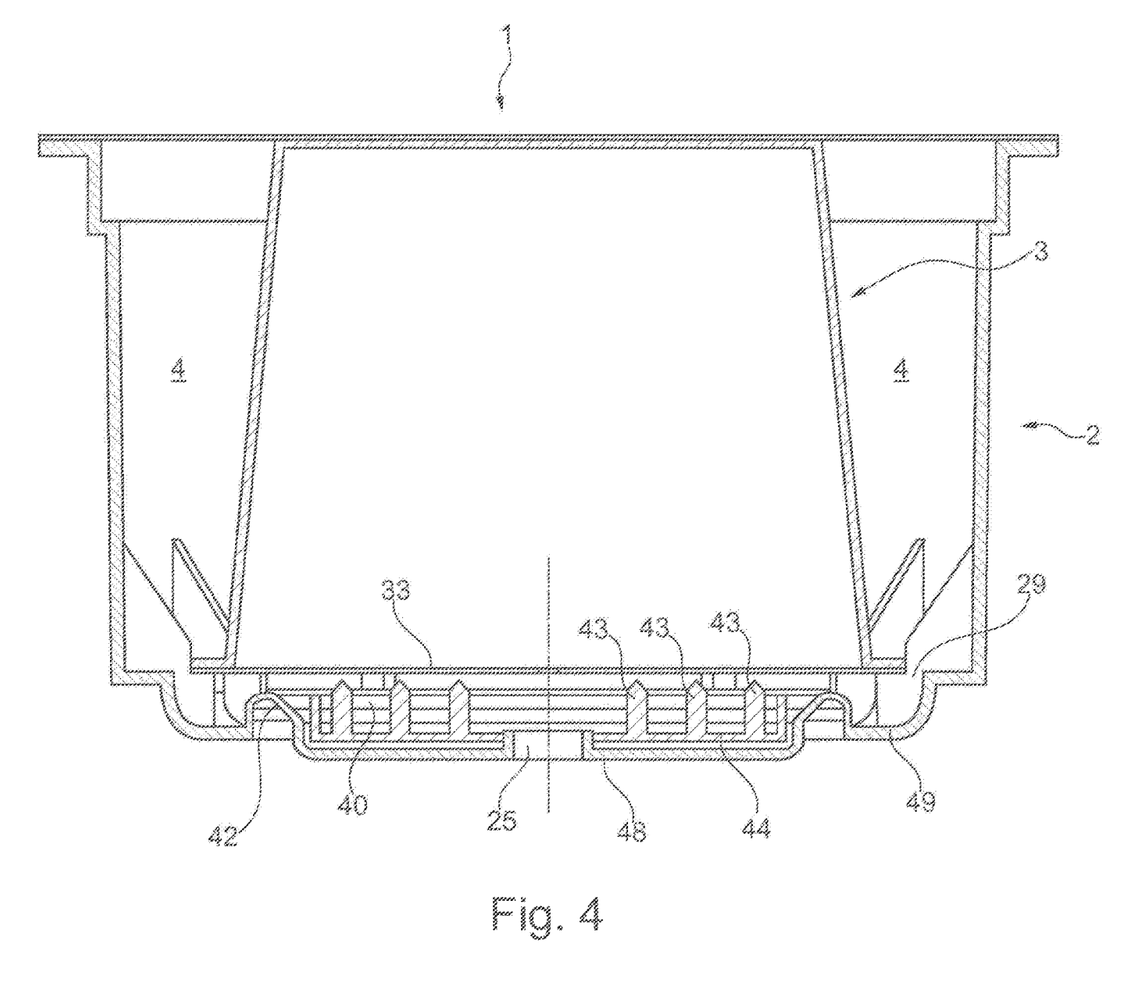
FIG. 4 is a variant of the capsule system according to FIG. 1 with a separate perforation plate.

FIG. 4 shows a variant of the embodiment according to FIG. 1. In this embodiment, a perforation plate 44 rests on the bottom plate 48. The perforation plate 44 also has a central outlet opening, which is somewhat larger than the outlet opening 25 in the bottom plate 48. This bottom plate 48 is here held on the lower level, i.e., in a situation prior to performing the extraction. As a consequence, the bottom plate 48 lies deeper than the stationary edge area 49.

Before the sealing film 24 is welded onto the holding capsule 2, but after the extraction capsule 3 has been correctly positioned, the hollow space of the annular trough 4 can now be filled with a material to be admixed. In the present case, the connection between the annular trough and mixing chamber 40 is not closed. Accordingly, no flowable material can be filled into the annular trough in such an embodiment. However, the annular trough can indeed be filled with powdery or grit-like material, such as sugar or powdered milk.

When filling the annular trough 4, a portion will get through the flow-through openings 29 and into the annular channel present in proximity to the stationary edge area 49 of the bottom 20. This bulk material then forms a conical heap, which ultimately closes the flow-through opening 29. In such a variant, the outlet opening 25 must of course be closed with a tear-off tab. It makes sense to provide an at least approximately gastight film for this purpose. This can be an aluminum film or a multilayer plastic film, wherein this film can be welded on or adhesively bonded, as with the sealing film 24 or 33.

Figure 5:
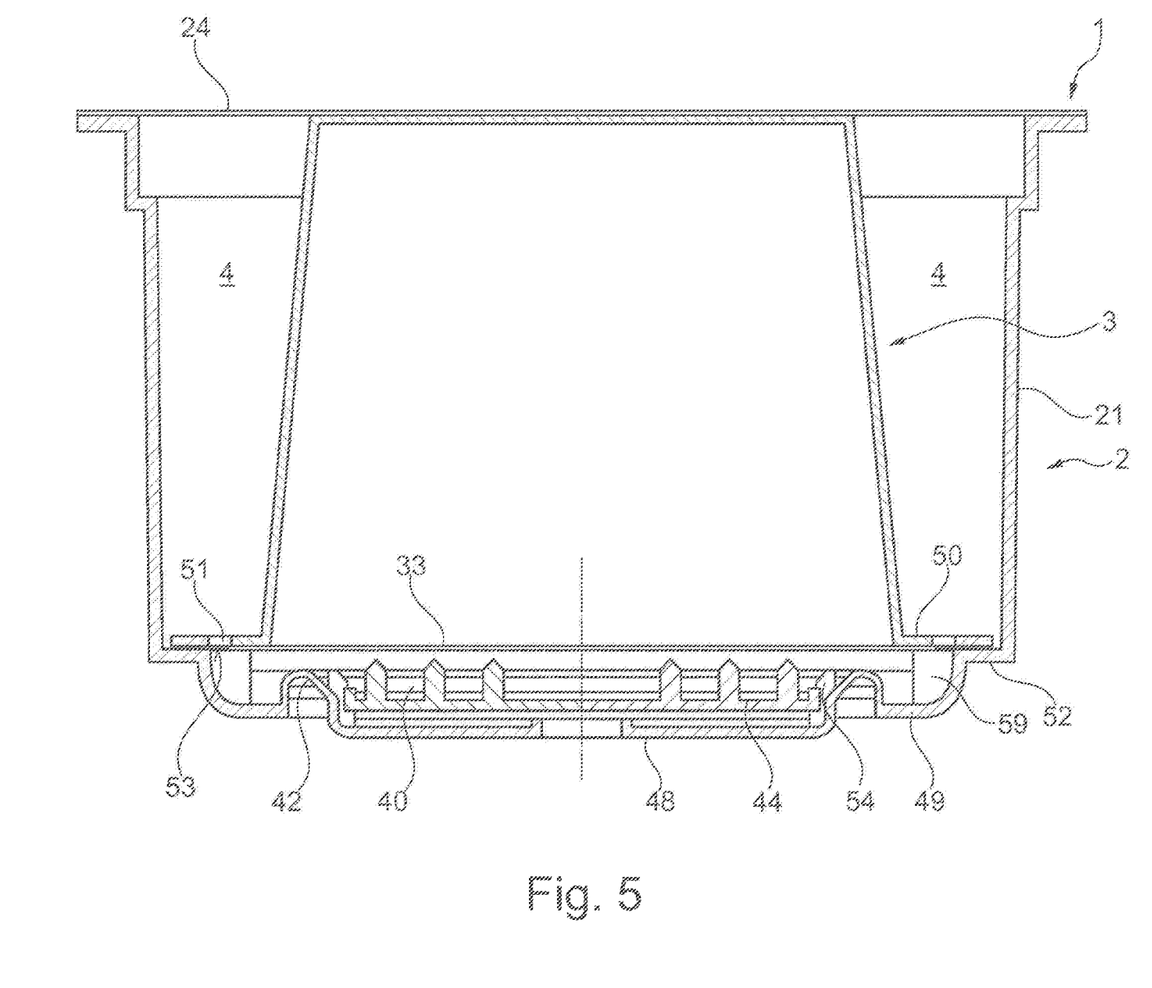
FIG. 5 is the capsule system according to the invention with a holding capsule having a modified console shape and an extraction capsule with an expanded flange, as well as FIG. 6 is the same holding capsule with a modified perforation plate, both versions once again in a diametric section.

The radially aligned ribs 23 are not used in this embodiment according to FIG. 5. Instead, the lower area of the conical lateral wall has a circumferential shoulder 52, upon which the outer area of the expanded flange 50 rests. Two different options are conceivable for once again filling the annular trough 4 here as well. In one case, the sealing film 33 of the extraction capsule 3 will only be allowed to extend up to the passages 51 in the expanded flange 50. In this way, the annular trough 4 can once again be filled in the same way as described above based on FIG. 4, wherein a portion once again passes through the open passages 51 and gets into the annular channel in the area of the stationary edge area 49.

A second option has to do with applying another film directly onto the circumferential shoulder 52, which closes the trough 4 relative to the mixing chamber 40. In order to open this film at least in the area of the passages 51, use can be made of an especially thin, somewhat brittle sealing film 33, which tears when exposed to the pressure in the annular trough 4 that builds up when mixing medium is induced in the annular trough by means of injection needles on the device side.

In an alternative solution, this film 53 applied thereunder could be made out of a water soluble material, for example based on sugar or gelatin.

In the embodiment shown here, the perforation plate 44 is held spaced apart over the bottom plate 48 by holding means 54. The gap between the perforation plate and hinge area 42 is sufficient for allowing a fully soluble agent to get out of the annular trough 4 under the perforation plate, and from there to the outside through the outlet opening 25. For example, such a solution is suitable for various powdery extracts or even powdered milk.

FIG. 6 shows a last variant of the capsule system according to the invention. The holding capsule 2 is here configured the same as in the embodiment according to FIG. 5, which also holds true for the configuration of the extraction capsule 3. This extraction capsule 3 is designed with an expanded flange 50 here as well. Passages 51 are also once again present in the flange 50. In this embodiment variant, either the sealing film 33 can extend up until over the passage openings 51 in the expanded flange 50, or a continuous film is welded onto the circumferential shoulder 52, while the sealing film 33 of the extraction capsule 3 only extends up until the passage openings 51.

In the variants according to FIGS. 5 and 6, it makes sense to provide radially running stiffening ribs 59 in the vicinity of the stationary edge area.

A separate perforation plate 44 is present once again in this embodiment. The underside of this perforation plate 44 has flow baffle plates 41, which rest directly on the bottom plate 48 of the bottom 20 of the holding capsule 2. The actual perforation plate 44 extends over the area of the bottom plate 48 up to the annular hinge area 42. However, the perforation plate 44 has radially outwardly elongated arms 55, on which are secured perforation spikes 56 oriented vertically upward. These face upwardly just like the perforation means 43, and can penetrate through the sealing film 33 in the area of the passage openings 51 in the expanded flange 50.

The perforation means 43 along with the perforation spikes 56 penetrate through the sealing film 33 when pressure is exerted on the bottom plate 48. This solution is not trivial in its implementation, since the passage openings 51 in the expanded flange 50 and the perforation spikes 56 on the perforation plate 44 must be aligned flush one on top of the other just to enable this at all. However, this means that corresponding means must be present in the holding capsule 2 to ensure an exact alignment of the perforation plate 44 relative to the holding capsule 2, and on the other hand just as exact an alignment of the extraction capsule in the holding capsule 2.

This also necessitates very complicated assembly machines to even make this possible at all.

Figure 7:
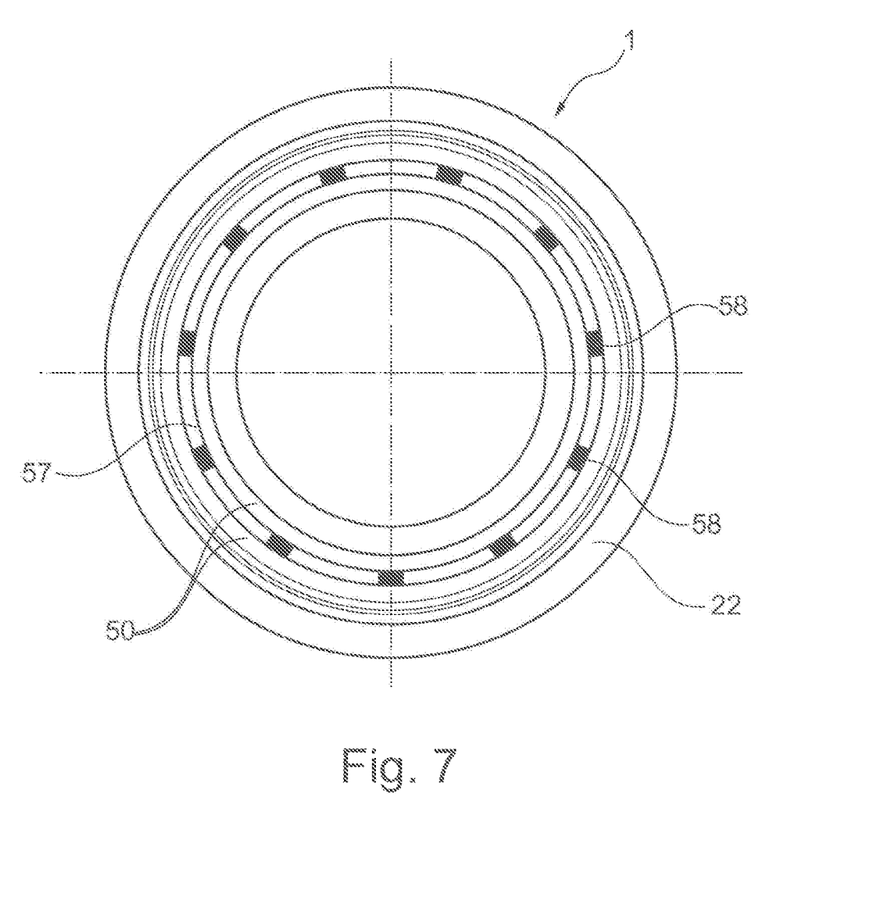
FIG. 7 is a view from above of the capsule system according to FIG. 5 or 6 with a specially configured shape of the flange of the extraction capsule.

FIG. 7 shows an especially simple solution to this problem. A top view of the capsule system 1 according to FIG. 6 is here shown from above, leaving out the sealing film 24. Visible outermost is the flange 22 of the holding capsule 2, which is followed by an inwardly displaced, expanded flange 50 of the extraction capsule 3. A gap 57 is now formed in this expanded flange 50, and is bridged by a number of bridges 58 that connect the inner and outer areas of the expanded flange 50. If a prime number is selected for the number of bridges 58, eleven bridges 58 in the present case, only an even number that is not a multiple of the number of bridges 58 need be provided relative to the perforation spikes 56 also uniformly molded onto the perforation plate 44. In the worst case, only one perforation spike 56 will thus hit one of the bridges 58. This will either cause the corresponding bridge 58 to break, or make the extraction capsule 3 easy to twist.

When perforated, the sealing film generally tends to tear next to the perforation site, in particular if a pressure on the sealing film 33 is built up in the annular trough 4 by the injected liquid. This yields very large flow-through openings in the sealing film 33. As a result, even partially soluble or even insoluble constituents can be extracted from the annular trough 4. These will flow over the perforation plate 44, if the arms 55 are omitted and the perforation plate is completely closed in design up to the spikes 56. The mixture of injected mixing medium and material accommodated in the chamber flows out of the annular trough 4 and onto the perforation plate 44. An extraction medium that has flowed through the extraction chamber is here also mixed with the mixing medium that passed through the annular trough. However, if the perforation spikes 46 are held on arms 55, the mixing medium that passed through the annular trough will get into the channel-shaped region of the stationary edge area 49, and from there via the hinge area 42 onto the central, plate-shaped portion of the extraction-side bottom 20, specifically the bottom plate 48, while the extraction agent also gets into the area under the perforation plate 44 in the same way via the perforation plate, and there is mixed with the mixing medium. The elongations of the perforation means 43 then in part constitute the flow baffle plates 41, which stand on the bottom plate 48. In this version, the outlet 25 does not have to be covered.

However, if the perforation spikes 56 are arranged on a perforation plate 44 that runs completely to the outside, this perforation plate 44 must have corresponding outflow openings, which allow the mixed media with the portions located therein to pass through, so that they can get into the mixing chamber 40, and from there to the outlet opening 25.

Such a capsule system requires a new preparation machine adjusted to this capsule system. The latter must have not just injection needles that penetrate into the extraction capsule as before, but also injection needles that empty into the annular trough 4. It also makes sense for such a preparation machine to be capable of injecting various liquid media. However, these media can be identical for both the extraction capsule 3 and the annular trough 4, and have the same temperature, or be identical and have different temperatures. Furthermore, however, these media, the mixing medium and extraction medium, can also differ as a function of application, with a wide variety of mixing and extraction media being possible, depending on whether the case involves foods or chemical substances present in the extraction chamber or annular trough 4. In addition, these two media can also be injected simultaneously or sequentially through the extraction chamber or through the annular trough. There is a countless variety of possible applications for this capsule system.

REFERENCE LIST

1 Capsule system
2 Holding capsule
3 Extraction capsule
4 Annular trough
20 Extraction-side bottom of the holding capsule 2
21 Conical lateral wall
22 Flange of the holding capsule
23 Support means, radially running ribs
24 Sealing film
25 Outlet opening
26 Injection-side opening
27 Step in ribs 23
28 Centering ramp
29 Through-flow opening
30 Injection-side bottom of the extraction capsule 3
31 Extraction-side opening
32 Flange on the extraction capsule 3
33 Sealing film of the extraction capsule
34 Conical lateral wall
35 Peripheral welding bead
40 Mixing chamber
41 Flow baffle plates
42 Annular hinge area
43 Perforation means
44 Perforation plate
46 Screen plate or screen mat
47 Annular support stiffener
48 Central plate-shaped part of the extraction-side bottom 20, bottom plate
49 Stationary edge area
50 Expanded flange of the extraction capsule
51 Passage openings in the expanded flange 50
52 Circumferential shoulder
53 Passages in the sealing film
54 Holding means for the perforation plate
55 Arms
56 Perforation spikes
57 Circumferential gap
58 Bridges
59 Stiffening ribs

The invention claimed is:

1. A capsule system with a closed extraction capsule having an extraction side and an injection-side bottom and an extraction side opening, that expands conically to the extraction side and is closed with a sealing film, and a peripherally outwardly aligned flange, wherein the closed extraction capsule is held in a holding capsule injection molded out of plastic, wherein the holding capsule has an extraction-side bottom with an adjoining lateral wall that expands conically toward an injection side, which ends with an outwardly oriented flange defining an opening closed with a sealing film, wherein a fillable, annular trough remains between the two capsules, making it possible to inject an extraction medium from the injection side into the extraction capsule, and a mixing medium into the annular trough, and wherein the extraction medium flows through the extraction capsule, and a mixing medium flows around the extraction capsule, the bottom of the holding capsule has at least one outlet opening, and wherein the bottom of the holding capsule has a stationary edge area, and an adjoining bottom plate movable via an annular hinge area is molded thereto, which bottom plate is provided with a perforator, which penetrates through the sealing film of the extraction capsule when a force is applied to the bottom plate.

2. The capsule system according to claim 1, wherein the holding capsule is provided with a console, upon which the extraction capsule rests in the holding capsule wherein the console consists of a variety of radially aligned ribs, which each have molded into them a step, wherein all steps lie in a plane parallel to the circumferential flange of the holding capsule or wherein the console is a circumferential shoulder formed in the area of the lateral wall close to the bottom.

3. The capsule system according to claim 2, wherein the steps in the radially aligned ribs are spaced apart from the lateral wall, so that the mixing medium can flow between the flange of the extraction capsule and the lateral wall of the holding capsule, as well as through a through-flow opening formed between a respective two adjacent, radially aligned ribs.

4. The capsule system according to claim 2, wherein the radially aligned ribs are upwardly and outwardly inclined above the step and run out into the lateral wall.

5. The capsule system according to claim 2, wherein the radially aligned ribs extend into the stationary edge area of the bottom of the holding capsule.

6. The capsule system according to claim 2, wherein the extraction capsule has an expanded flange that rests on the circumferential shoulder, and the expanded flange has passage openings through which the mixing medium can flow.

7. The capsule system according to claim 6, wherein the sealing film applied to the expanded flange of the extraction capsule covers the passage openings.

8. The capsule system according to claim 6, wherein a series of circumferential gaps, is formed in the expanded flange of the extraction capsule, and the passage openings are covered by the sealing film.

9. The capsule system according to claim 8, wherein perforation spikes aligned to the passage openings are secured to the bottom plate.

10. The capsule system according to claim 2, wherein a series of radially aligned stiffening ribs are molded in the stationary edge area of the bottom of the holding capsule.

11. The capsule system according to claim 1, wherein a perforation plate with the perforator is supported on the bottom plate or spaced apart from the bottom plate.

* * * * *